United States Patent [19]
Moroney et al.

[11] Patent Number: 5,949,795
[45] Date of Patent: Sep. 7, 1999

[54] PROCESSING ASYNCHRONOUS DATA WITHIN A SET-TOP DECODER

[75] Inventors: Paul Moroney, Olivenhain; Ken Bell, San Diego, both of Calif.

[73] Assignee: General Instrument Corporation, Horsham, Pa.

[21] Appl. No.: 08/800,877

[22] Filed: Feb. 14, 1997

[51] Int. Cl.$^6$ ...................................................... H04J 3/06
[52] U.S. Cl. .......................... 370/516; 348/10; 370/468
[58] Field of Search .................................... 370/229, 230, 370/231, 235, 516, 517, 412, 466, 468; 375/371, 372, 376; 365/189.01; 348/10; 711/100, 111, 112

[56] References Cited

U.S. PATENT DOCUMENTS

| | | | |
|---|---|---|---|
| 5,291,468 | 3/1994 | Carmon et al. | 711/112 |
| 5,323,272 | 6/1994 | Klingler | 360/8 |
| 5,396,492 | 3/1995 | Lien | 370/412 |
| 5,526,362 | 6/1996 | Thompson et al. | 370/516 |
| 5,566,208 | 10/1996 | Balakrishnan | 375/240 |

*Primary Examiner*—Chau Nguyen
*Assistant Examiner*—Kenneth Vanderpuye
*Attorney, Agent, or Firm*—Barry R. Lipsitz; Ralph F. Hoppin

[57] ABSTRACT

Data overflow in a buffer of a set-top decoder for receiving asynchronous data, such as digital television signals, is prevented while also maintaining compliance with an interface timing standard such as the RS404-A standard. A fullness level of the buffer is monitored to determine whether the fullness falls within a first, nominal range, or into second or third higher ranges. A clocking signal is derived from a ratio of a fixed reference clock signal and a divisor for outputting asynchronous data from the buffer at a desired rate. A direct digital synthesis (DDS) circuit may be used to provide a fractional divisor. The divisor is selected to provide the clocking signal at a rate so that a difference between a target output rate and the actual output rate falls within a data performance standard such as the RS404-A standard.

22 Claims, 3 Drawing Sheets

PROCESSING ASYNCHRONOUS DATA WITHIN A SET-TOP DECODER

BACKGROUND OF THE INVENTION

The present invention relates to a method and apparatus for processing data within a set-top decoder such as that used to receive digital television signals. In particular, the invention relates to a method and apparatus for preventing the overflow of data in a buffer while maintaining compliance with an interface timing performance standard such as the RS404-A standard of the Electronic Industries Association (EIA).

Technology for the transmission of digital television signals continues to advance in view of increasing consumer demand. Digital television signals provide a sharp picture and a high-fidelity audio signal, in addition to providing the viewer with a larger selection of available programming. In fact, digital programming is expected to eventually supplant existing analog schemes.

Various transmission standards have been created, including the Motion Picture Expert Group's MPEG-2 standard and the similar Digicipher II standard which is proprietary to General Instrument Corporation of Chicago, Ill., U.S.A. Additionally, the RS404-A performance standard has been promulgated by the Electronic Industries Association (EIA) to provide a baseline for interface timing during the transmission of asynchronous (e.g., start-stop) data. The standard is set forth in the documents entitled "Standard for Start-Stop Signal Quality Between Data Terminal Equipment and Non-Synchronous Data Communication Equipment—EIA Standard RS-404", Electronic Industries Association, Washington, D.C., U.S.A., Mar. 1973; and "Application of Signal Quality Requirements to RS-449—Addendum No. 1 to RS-334-A and RS-404," Electronic Industries Association, May 1983. In particular, the RS404 standard is a performance standard which specifies the quality of serial binary signals which are exchanged across an interface between start-stop (e.g., asynchronous) data terminal equipment (such as a processor or teleprinter) and non-synchronous data communications equipment (such as a data set or signal converter) as defined in EIA standard RS-232-C. The data communications equipment is considered to be non-synchronous if the timing signal circuits across the interface are not required at either the transmitting terminal or the receiving terminal.

Digital television signals may be delivered as asynchronous data to a set-top box (e.g., decoder) of the television. Various interface, syntax, buffer requirements and decoder timing requirements must be established. In particular, to minimize the cost of the decoder, it is desirable to minimize the size of the memory which is required to temporarily store the received data until it can be processed and displayed.

In general, an asynchronous data component is one in which data is delivered at low rates without an accompanying clock. The data comprises a succession of characters which are delivered irregularly. This is the type of data which is typically used by the RS232-C serial port of a personal computer. The RS-232 standard is described in the document entitled "Interface Between Data Terminal Equipment and Data Communication Equipment Employing Serial Binary Data Interchange," Electronic Industries Association.

In an asynchronous, or start-stop system, a group of code elements which correspond to a character is preceded by a start element which prepares the receiving equipment for the reception and registration of a character, and is followed by a stop element during which the receiving equipment comes to rest in preparation for the reception of the next character. In a continuous start-stop system, a signal represents a series of characters which follow one another at a nominal character rate. In contrast, in a synchronous system, the sending and receiving data terminal equipment are operating continuously at substantially the same frequency, and are maintained in a desired phase relationship, for example, using a phase-locked loop.

The RS404-A specification for interface timing describes the timing parameters which are associated with each received bit of a character, as well as the start and stop bits. In particular, the minimum description of an asynchronous character requires ten bits, namely, one start bit, seven data bits, one parity bit, and one stop bit. Optionally, two stop bits instead of one may be provided. Additionally, parity may be even or odd. Alternatively, there may be no parity, in which case eight data bits are provided in each character. The term "mark" is associated with a "1", and the term "space" is associated with a "0". The RS232-C standard essentially describes signal voltage levels above +3 volts (V) as representing a space, while a voltage level below −3 V represents a mark, among other electrical interface parameters.

For asynchronous data components that conform to the RS404-A and RS232-C standards, and with data at nominal rates of 1,200, 2,400, 4,800, 9,600 and 19,200 bits per second (bps), processing of the asynchronous data at an encoder must accomplish various tasks. Specifically, the encoder must input serial data, remove start and stop bits, buffer the resulting eight-bit bytes, build packets of these bytes according to the asynchronous data syntax, and send (e.g., transmit) each packet when constructed. The sending of the packets should be delayed to approximately match the video throughput delay of the system, or, if a packet is only partially full because data arrival is irregular, the encoder should implement a latency time-out of, for example, one second. Moreover, the multiplexing and transmission of the asynchronous data packets should conform to a decoder model.

Generally, the decoder must reverse the steps performed by the encoder. In particular, the decoder must buffer the received data. To provide maximum flexibility for multiplexers, a decoder model will typically include a 512 byte transport buffer which is defined for video, audio and isochronous data service components. After removing transport headers and adaptation fields, if any, and the data syntax overhead, the remaining bytes are sent to the main asynchronous data buffer of the decoder similar to MPEG Systems buffer applications. The transfer time is defined assuming that a character rate parameter which corresponds to a minimum average character interval of the RS404-A standard is input to the encoder. A character interval is the duration of a character expressed as the total number of unit intervals, including information, error checking and control bits and the start and stop elements, which are required to transmit a character. As explained in the RS404-A specification, a unit interval is the duration of the shortest nominal signal element. That is, the unit interval is the longest interval of time such that the nominal durations of the start and information elements are integer multiples of the unit interval. A model decoder main buffer is assumed to include 4 msec. of information plus thirty-two bytes. Bytes (e.g., asynchronous data "access units") are removed from the model main buffer at the rate described. The purpose of the decoder buffer model is to define constraints for the encoder. That is, the encoder must build the transport multiplex such that neither the transport nor the main buffers overflow.

As with video, audio and isochronous data, an actual decoder implementation may not match the model in detail. For example, generally, only a single decoder buffer is required, and it must be larger than the size which is suggested by the model. In addition, the decoder buffer may only store asynchronous data bytes, without header information.

The decoder must produce a clock signal to output the asynchronous data from the decoder buffer while not knowing the exact value of the rate. Usually, any clock rate which is close to the nominal bit rate will be effective since the data arrival at the decoder is generally irregular. However, in the case of continuous start-stop operation as described by the RS404-A standard, it is possible for a decoder built with a nominal clock generation to overflow (i.e., overfill its data buffer) when the minimum average character interval is used.

Accordingly, it would be desirable to provide a method and apparatus for avoiding overflow of a decoder buffer. In particular, the scheme should prevent a buffer overflow when using the continuous start-stop operation as described by the RS404-A or similar standard, while also minimizing a data output rate tolerance. The scheme should further provide an output data rate tolerance which conforms to a data rate performance standard such as the RS404-A standard. The present invention provides a method and apparatus having the above and other advantages.

SUMMARY OF THE INVENTION

In accordance with the present invention, a method and apparatus for preventing the overflow of data in a buffer while maintaining compliance with an interface timing standard such as the RS404-A standard is presented.

A method for managing an asynchronous data buffer to provide an output data stream comprises the steps of receiving asynchronous data at a nominal data rate and writing at least a portion of the received asynchronous data into the buffer. A fullness level of the buffer is monitored to determine whether the fullness falls within a first, nominal range, or into second or third higher ranges. For example, the buffer may have a capacity of 1024 bytes, the first range may be from 0 to 648 bytes, the second range may be from 648 to 836 bytes, and the third range may be from 836 to 1024 bytes.

A target data output rate is then determined, which may be 19,200 bits per second, or $19,200/2^n$ bits per second, where n is a non-negative integer (e.g., n=0, 1, 2, . . . ). A fixed reference clock signal having an associated rate, for example, 27 MHz is also provided. 27 MHz is selected as an example since it is used in the MPEG system. However, virtually any system clock frequency may be used. A clocking signal is provided for outputting the asynchronous data from the buffer at a rate which corresponds to a ratio of the associated rate and the divisor. A divisor is selected to provide the clocking signal at a first rate to minimize a difference between the target data output rate and the first rate when the buffer fullness falls within the first range. Optionally, a direct digital synthesis (DDS) circuit may be used to provide the clocking signal at the desired level by providing a fractional divisor.

When the buffer fullness falls within the second range, the divisor is selected to provide the clocking signal at a second rate which is greater than the first rate, such that a difference between the target data output rate and the output rate of the asynchronous data from the buffer is within first lower and upper bounds of a data performance standard. In particular, the divisor may be selected so that the second rate is minimally greater than a sum of (a) the first lower bound of the data performance standard and (b) a tolerance of the associated rate of the fixed reference clock signal. The first lower bound of the data performance standard may be 3,000 parts per million (ppm).

When the buffer fullness falls within the third range, the reference clock divisor is selected to provide the clocking signal at a third rate which is greater than the second rate. Furthermore, the divisor is selected so that a difference between the target data output rate and the output rate of the asynchronous data from the buffer is within second lower and upper bounds of the data performance standard, where the second lower bound is more tolerant than the first lower bound. The third divisor may be selected so that the third rate is minimally greater than a sum of (a) the second lower bound of the data performance standard and (b) a tolerance of the associated rate of the fixed reference clock signal. The second lower bound of the data performance standard may be 8,000 ppm.

Thus, by increasing the data output rate of the buffer when the buffer becomes increasingly full, the fullness level will decrease back toward the nominal level (e.g., 544 bytes for a 1024 byte buffer).

The first lower and upper bounds of the data performance standard may correspond to the RS404-A category II standard, which allows a difference between the target data output rate and the second rate to be between 3,000 and 8,000 parts per million (ppm). The second lower and upper bounds may correspond to the RS404-A category III standard, which allows the difference between the target data output rate and the third rate to be between 8,000 and 10,000 ppm. Similarly, the RS404-A category IV standard allows the difference between the target data output rate and the actual output rate to be between 10,000 and 12,000 ppm.

In a particular implementation, when the target data output rate is approximately $19,200/2^n$ bits per second, where n is a non-negative integer, and the associated rate of the fixed reference clock signal is approximately 27 MHz, the divisor is selected to be 1406 to provide the first rate at $27\ \text{MHz}/1406/2^n$ when the buffer fullness falls within the first range. The divisor is selected to be 1401 to provide the second rate at $27\ \text{MHz}/1401/2^n$ when the monitoring step determines that the buffer fullness falls within the second range. The divisor is selected to be 1395 to provide the third rate at $27\ \text{MHz}/1395/2^n$ when the buffer fullness falls within the third range.

Additionally, the first buffer fullness range may extend below approximately 648/1024 of a maximum buffer fullness level, the second buffer fullness range may extend above approximately 648/1024 of a maximum buffer fullness level, and a third buffer fullness range may extend above approximately 836/1024 of a maximum buffer fullness level. The rate of the clocking signal is thus adjusted to maintain the buffer fullness at a nominal level to avoid an overflow.

A corresponding apparatus is also presented.

DETAILED DESCRIPTION OF THE INVENTION

A method and apparatus are presented for preventing the overflow of data in a buffer while maintaining compliance with an interface timing standard such as the RS404-A standard.

Figure 1:
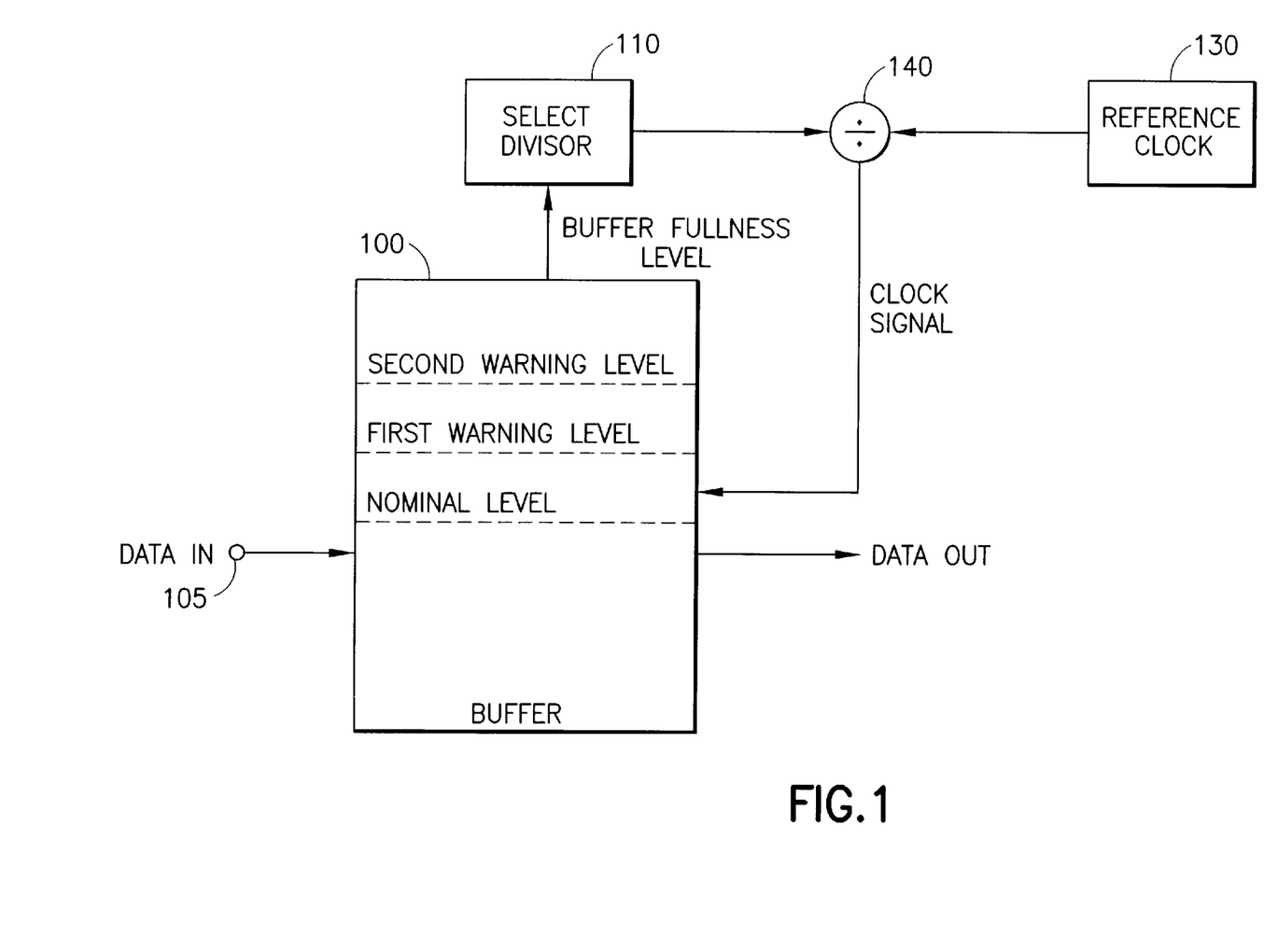
FIG. 1 is a simplified block diagram of a buffer processing apparatus in accordance with the present invention.

FIG. 1 is a simplified block diagram of a buffer processing apparatus in accordance with the present invention. The buffer 100 receives asynchronous data via an input terminal 105 and temporarily stores the data. Since the decoder model includes a 512 byte transport buffer plus a 32 byte main buffer, the decoder implementation must have a buffer of greater than 544 bytes. In the disclosed example implementation of the present invention, the buffer size is set to 1,024 bytes. With this size, given nominal data transmission rates, the buffer occupancy (e.g., fullness level) should never exceed about 544 bytes of stored transport data. Additionally, at least two buffer warning levels are defined, including a first warning level at 648 bytes, and a second warning level at 836 bytes. A nominal level at 544 bytes is also shown. With a packet size of 188 bytes, the buffer will be one or two packets away from being full when the buffer fullness reaches 836 or 648 bytes, respectively. Thus, a first buffer fullness range may extend from 0 to 648 bytes, while a second range extends from 648 to 836 bytes, and a third range extends from 836 to 1,024 bytes.

When the buffer occupancy exceeds the first warning level (e.g., 648 bytes), the output data rate from the buffer is immediately increased until the buffer occupancy level falls back below 648 bytes. However, if the buffer occupancy level continues to increase, and passes the second warning level (e.g., 836 bytes), the output data rate is increased again. In accordance with the present invention, the data output rate is increased according to the constraints of a performance standard such as the RS404-A standard. This is accomplished by providing a signal which is indicative of the buffer fullness level to a divisor select function 110, which may include a memory with look-up table data which incorporates the RS404-A standard and a tolerance of the reference clock.

The buffer fullness level may be determined, for example, by monitoring the addresses which are used to store data in the buffer 100. That is, a fullness level can be correlated with a buffer address in which data is stored. The divisor select function 110 selects a divisor using the buffer fullness level and provides the selected divisor to a divider 140. The divider 140 receives a steady clock signal, e.g., at 27 MHz, from a reference clock function 130. The 27 MHz signal is divided by the selected divisor to provide a clock signal to the buffer 100 for outputting data at the specified rate. Additional dividers, not shown, may be provided for reducing the clock signal rate by a factor of $2^n$, where n is a non-negative integer (e.g., n=0, 1, 2, . . . ).

Decoder processing can be summarized by the following events. First, asynchronous data transport packets are received, and a continuity count is processed to drop duplicate packets. On acquisition, data bytes arriving in packets are ignored until a syntax header, indicating the desired output bit rate, is found. The nominal decoder buffer clock for outputting data from the buffer is set up according to the desired bit rate. Subsequently received data bytes are stored in the buffer, which may be a dynamic random access memory (DRAM) buffer. Further data syntax headers can be checked and processed. It should be appreciated that the headers are not stored in the buffer; only the corresponding data is stored. Bytes are removed from the buffer as available, serialized, a start bit (space) is added, a stop bit (mark) is added, and the data is output based on the output clock rate. Finally, the DRAM buffer is monitored to select the appropriate clock. Whenever the clock rate must be changed, it must be shortened or lengthened by an increment which corresponds to the RS404-A or similar standard. Runt clocks or double clock lengths should not occur.

The decoder must be able to produce a nominal clock for operation at, for example, 1,200, 2,400, 4,800, 9,600, or 19,200 bps. Starting from a 27 MHz fixed (e.g., open loop) reference clock, which may be accurate to no worse than +/−50 ppm, for example, while processing video, audio, or isochronous data, a fixed divide ratio which yields exactly the desired bit rate would be ideal. However, this is not possible, as a divisor of 1,406, for example, produces a clock which is 178 parts per million (ppm) (e.g., 3.4 bps) above 19,200 bps. This is true since 27,000,000/1406=19,203.4, and $10^6 \times (19,203.4-19,200)/19,200=178$ ppm. Thus, the error between the target data output rate and the actual rate is 178 ppm.

Additionally, the 27 MHz signal will not be exact, and may vary, for instance, by +/−1,350 Hz when the error tolerance is +/−50 ppm, since 50 ppm×27 MHz=1,350. In this case, the actual generated signal would vary between 128 and 228 ppm above nominal (e.g., 178 +/−50 ppm), depending on the specific value of the 27 MHz oscillator. Furthermore, a divisor of 1,405 would produce a clock which is 890 ppm (e.g., 217.1 bps) above 19,200 since 27,000,000/1405=19,217.1, and $10^6 \times (19,217.1-19,200)/19,200=890$ ppm. Thus, a divisor of 1,406 yields an actual rate which is closest to the target rate of 19,200 bps.

In accordance with the present invention, the divisor is also selected using the rate definitions of a performance standard such as the RS404-A standard. RS404-A category I is the most tightly specified mode of electronic timing operation for an asynchronous data source. The minimum average character interval may be 3% of a bit time low, which for 10 bits per character, translates to an allowed rate of 3,000 ppm above nominal. Category II allows the rate to be 8,000 ppm above nominal. Category III allows the rate to be 10,000 ppm above nominal, and category IV allows the rate to be 12,000 ppm above nominal. Moreover, the international specification on asynchronous timing, ISO 7480, defines an additional parameter called "modulation rate accuracy," which describes the allowed difference between the nominal rate and the true average rate. For electronic timing, both categories of ISO 7480 timing limit this difference to 2,000 ppm. Thus it does not appear critical to support timing for categories III and IV for the limited case of continuous start-stop operation at the maximum rates.

For a data rate of 19,200 bps, a divisor of 1,406 can be assigned to the nominal output case, while 1,401 can be used for the first buffer fullness warning level, and 1395 for the second buffer fullness warning level. As mentioned, a divisor of 1,406 yields a data rate that is 178 ppm above nominal. Similarly, a divisor of 1,401 yields a data rate which is 3,747 ppm (e.g., 271.9 bps) above nominal since 27,000,000/1401=19,271.9, and $10^6 \times (19,271.1-19,200)/19,200=3,747$ ppm. This data rate error of 3,747 ppm (+/−50 ppm) is sufficient to maintain an incoming signal within the RS404-A category I standard (e.g., 3,000 ppm) while providing the smallest data output rate error. That is, a larger data rate error, such as 10,000 ppm could be used to maintain the incoming signal within the RS404-A category I standard, but the data output rate error would be unnecessarily large. Accordingly, one can meet the dual goals of maintaining the smallest data rate error while still adequately compensating for the difference between the target output data rate of the buffer and the rate at which the asynchronous data is received.

For example, if the buffer fullness level increases to the first warning level, and the difference between the target output data rate of the buffer and the rate at which the asynchronous data is received is 3,000 ppm or less (e.g., RS404-A category I), the output data rate of the buffer will increase to 3,747 ppm over the target output rate. Thus, the buffer fullness level will decrease at a rate which is the difference between 3,747 ppm and the delta of the rate at which the asynchronous data is received (e.g., 3,000 ppm or less).

As an illustration, suppose the target output data rate is 19,200 bps, and the asynchronous data is received at 19,248 bps, which is 2,500 ppm above 19,200. With the buffer fullness below the first warning level, the actual data output rate will be approximately 19,203 bps with a 27 MHz clock and a 1,406 divisor as discussed above, assuming no error in the reference clock. Thus, the buffer fullness level will increase at a rate of 19,248−19,203=45 bps. When the buffer fullness level reaches the first warning level, the data output rate will increase to 19,272 bps (e.g., corresponding to 3,747 ppm), and the buffer level will begin to decrease by a rate of 19,272−19,248=24 bps (e.g., corresponding to 3,747−2,500=1,247 ppm). Eventually, the buffer fullness level will fall below the first warning level, and the data output rate will drop back to 19,203 bps. If, however, the asynchronous data is received at greater than 19,272 bps, the buffer fullness will increase through the first and second warning levels. At the second warning level, the output data rate will increase to 19,355 bps (e.g., 8,065 ppm). Additional warning levels can be provided as required.

Note that a divisor of 1,402 yields a data rate which is 3,031 ppm above the target rate, and this would normally be sufficient to maintain an incoming signal within the RS404-A category I standard while providing an even smaller data output rate error than 3,747 ppm. However, when a +/−50 ppm reference clock tolerance is considered, in a worst case scenario the output data rate could fall below 3,000 ppm (e.g., 3,031−50=2,981 ppm). In this case, the buffer could continue to become more full if the data rate of the category I input data was between 2,981 and 3,000 ppm above the target rate. However, if the magnitude of the error tolerance of the reference clock was less than 31 ppm, then 1,402 would be a suitable divisor. Thus, the divisor of the reference clock is selected to provide a data output rate error (e.g., the difference between the target output data and the actual output data rate) which is greater than the sum of the RS404-A category standard and the reference clock tolerance. Preferably, the data output error rate is minimally above the sum of the RS404-A category standard and the reference clock tolerance so that the data output rate error is minimized. Similarly, a divisor of 1,395 yields a data rate which is 8,065 (+/−50) ppm above the target rate since 27,000,000/1,395=19,354.8, and $10^6 \times (19,354.8-19,200)/19,200=8,065$ ppm.

Thus, a divisor of 1,406 produces a clock rate which is minimally above nominal, while a divisor of 1,401 produces a clock rate which is above the RS404-A category I input maximum while providing the smallest data output rate error, and a divisor of 1,395 produces a clock rate which is above the RS404-A category II input maximum while providing the smallest data output rate error.

Note the effect of continuous start-stop operation at a maximum rate for any category. Specifically, a continuous category I input to the encoder at 3,000 ppm above nominal would produce a decoder output with bursts at a rate between 3,697 and 3,797 ppm (e.g., 3,747 +/−50 ppm) above nominal, which now satisfies only category II timing. Similarly, a continuous category II input at 8,000 ppm above nominal will produce a category III decoder output with bursts at a rate between 8,015 and 8,115 ppm (e.g., 8,065 +/−50 ppm) above nominal. These examples are fairly worst case in nature.

Thus, in summary, the decoder clock generator must be able to divide the 27 MHz reference oscillator by 1,406, 1,401, or 1,395 to produce the desired clock signal with a target rate of 19,200 bps. For 9,600, 4,800, 2,400, or 1,200 bps, an additional divider of 2, 4, 8, or 16, respectively, should be employed.

The above results are summarized as follows for a target output data rate of 19,200 bps and a 27 MHz clock. The results account for a +/−50 ppm error tolerance for the 27 MHz reference clock. The preferred divisor may change if the reference clock error tolerance changes.

|  | Maximum Error (ppm) | Data Rate (bps) |
|---|---|---|
| 27 MHz Clock Divisor | | |
| 1,406 | 178 | 19,203 |
| 1,401 | 3,747 | 19,272 |
| 1,395 | 8,065 | 19,355 |
| RS404-A Category | | |
| I | 3,000 | 19,258 |
| II | 8,000 | 19,354 |
| III | 10,000 | 19,392 |

Figure 2:
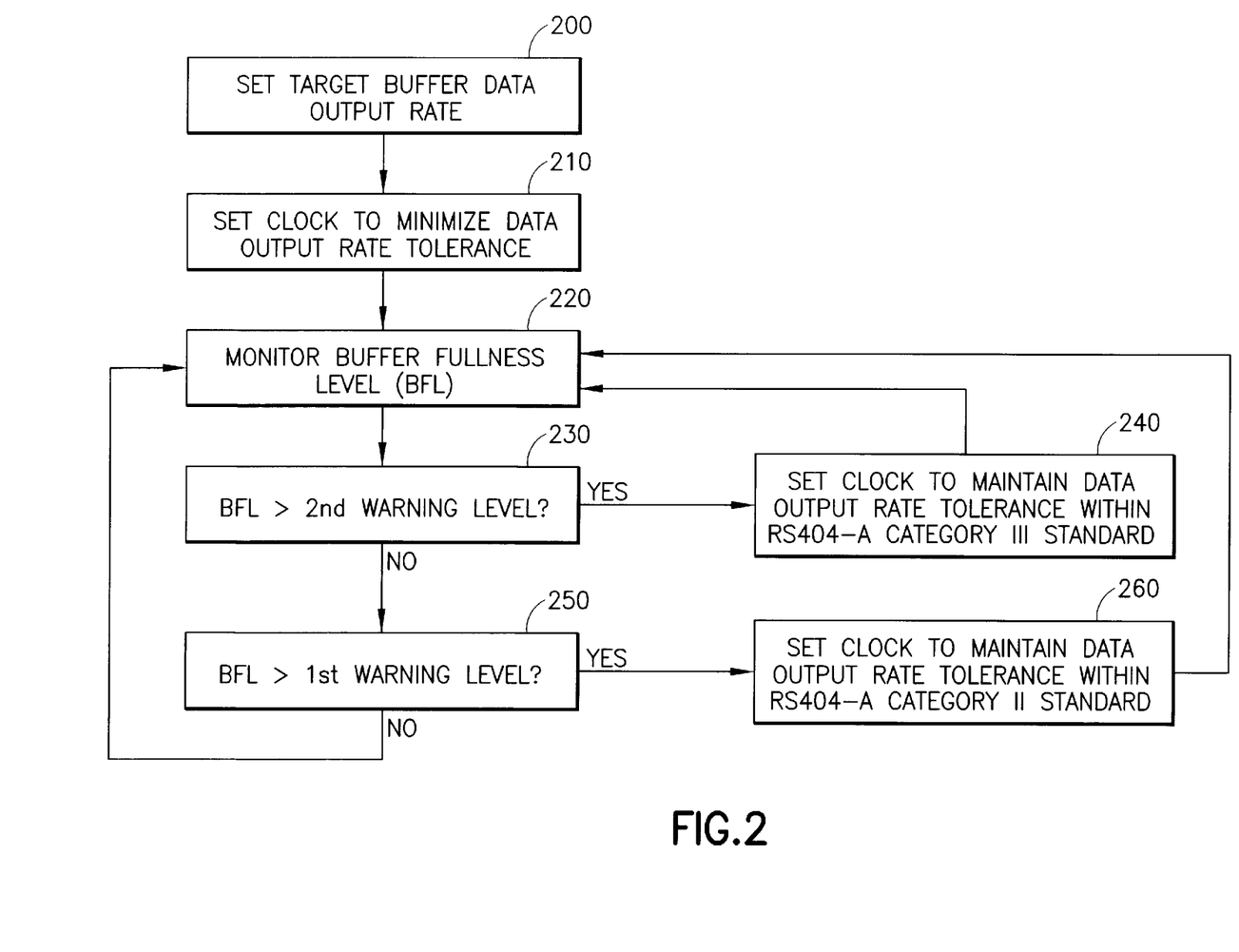
FIG. 2 is a flow chart of a method for outputting data from a buffer in accordance with the present invention.

FIG. 2 is a flow chart of a method for outputting data from a buffer in accordance with the present invention. At block 200, a target buffer data output rate, e.g., 19,200 bps, is determined. At block 210, the clock is set to minimize the data output rate error, which is the difference between the target data output rate and the actual output rate as set by the reference clock (including tolerance) and divisor. At block 220, the buffer fullness level (BFL) is monitored. At block 230, a determination is made as to whether the BFL is above the second warning level. If so, at block 240, the clock is set to maintain the data output rate error within the RS404-A category III standard (e.g., between 8,000 and 10,000 ppm) while providing the smallest data output rate error within category III. This may achieved by using a reference clock at 27 MHz and a divisor of 1,395, which corresponds to a data output rate error of 8,065 ppm. If the input data rate to the buffer is within the category II standard (e.g., 8,000 ppm or less), the buffer fullness level will decrease. The control flow then returns to function 220.

At block 250, a determination is made as to whether the BFL is above the first warning level. If so, at block 260, the clock is set to maintain the data output rate error within the RS404-A category II standard while providing the smallest data output rate error within category II. This may achieved by using a reference clock at 27 MHz and a divisor of 1,401, which corresponds to a data output rate error of 3,747 ppm. If the input data rate to the buffer is within the category I standard (e.g., 3,000 ppm or less), the buffer fullness level will decrease. The control flow then returns to function 220. If the BFL is not above the first warning level at block 250, the control flow returns directly to function 220 where buffer fullness monitoring continues.

Figure 3:
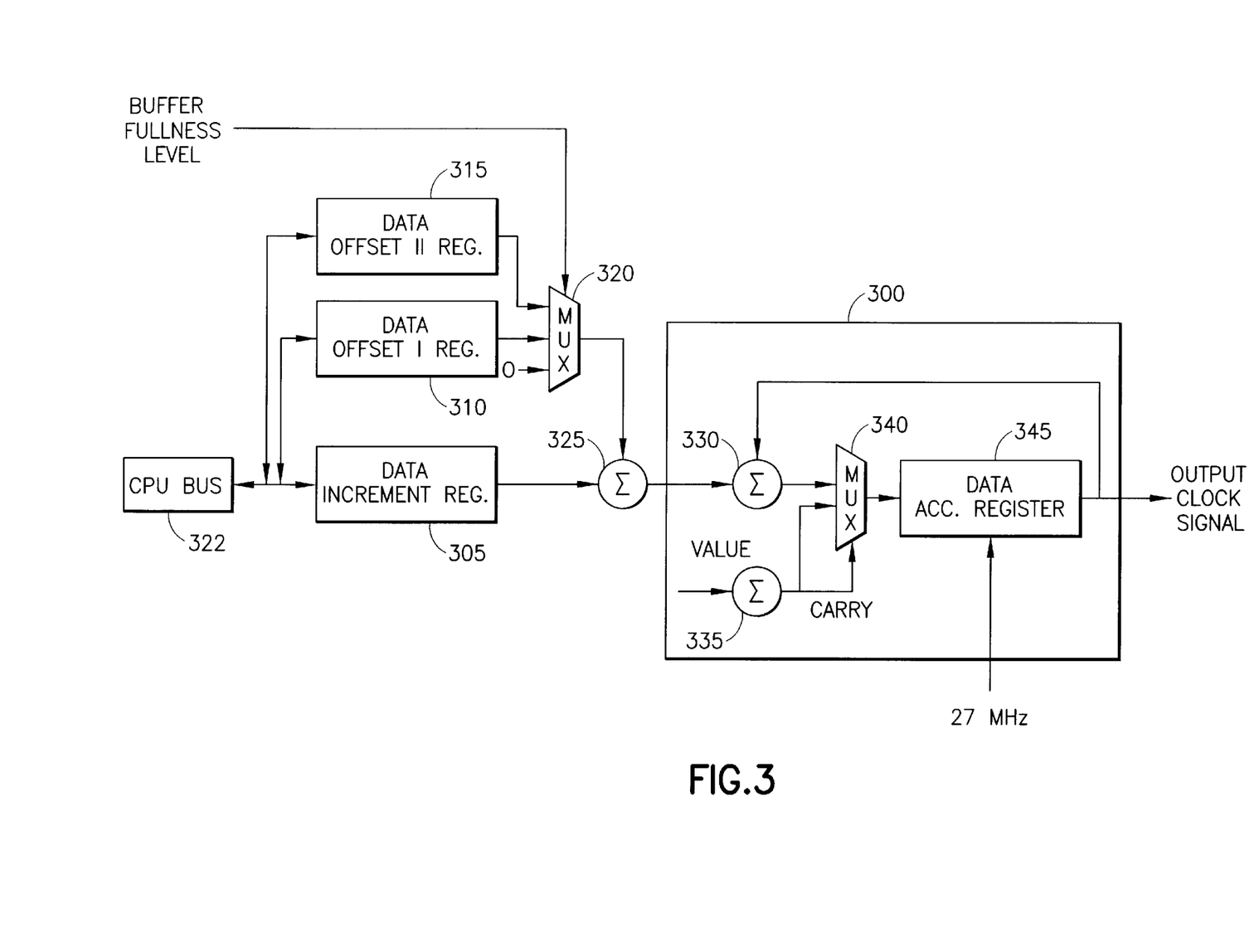
FIG. 3 is a block diagram of a direct digital synthesis circuit for obtaining a clock signal in accordance with the present invention.

FIG. 3 is a block diagram of a direct digital synthesis (DDS) circuit for obtaining a clock signal in accordance with the present invention. A modulo 536868000 counter may be used as a clock generator to achieve a desired asynchronous data rate. For asynchronous data, discrete frequencies in multiples of 1,200 baud are required. In particular, a rate of 19,200, may be achieved with the circuit of FIG. 3. A CPU bus 322 provides a data increment register 305 with an increment value which corresponds to the rate of the fixed reference clock (e.g., 27 MHz). The CPU bus 322 also provides corresponding offset increments to a data offset I register 310, and a data offset II register 315. The increment values shown below may be used with a 27 MHz reference clock.

| Output data rate | Data increment register | Offset I increment | Offset II increment |
| --- | --- | --- | --- |
| 1,200*k | 23,862*k | 64*k | 192*k |

For example, k=16 for an output data rate of 19,200 bps. The corresponding output of the data increment register 305 is 23,862×16 =381,792, the output of the data offset I register 310 is 64×16=1,024, and the output of the data offset II register 315 is 192×16=3,072.

The buffer fullness level signal from the buffer 100 controls a multiplexer (MUX) 320 to determine whether the output from the data offset I register 310, data offset II register 315, or a zero value will be output to a summer 325. When the buffer fullness level reaches the first warning level, the output from the data offset I register 310 will be selected and summed with the output from the data increment register 305 at the summer 325. Similarly, when the buffer fullness level reaches the second warning level, the output from data offset II register 315 will be selected and summed with the output from the data increment register 305 at the summer 325. If the buffer fullness level is below the first warning level, then the multiplexer 320 will pass a zero value.

The nominal or offset value from the summer 325 is provided to a DDS circuit 300, which includes a feedback summer 330, a modulus summer 335, a multiplexer 340 and a data accumulator register 345. The accumulator 345 receives the 27 MHz reference clock signal. The DDS circuit 300 acts as a fractional divisor for the reference clock signal since it provides an output clock signal at the desired rate (e.g., 19,200). Advantageously, a more accurate desired output rate can be achieved whereas an integer divider can result in a larger error. For example, the DDS circuit 300 can act as a fractional divisor of 1,406.25 to provide the output rate at 27 MHz/1406.25=19,200 bps.

The output rate of the DDS circuit is a function of the accumulator input increment, which is received from the summer 330. In particular, the summer 330 sums the output from the summer 325 and a feedback value from the accumulator. Another summer 335 receives the output from the summer 330 and a value which depends on the modulus of, (e.g., 536868000). The mux 340 selects the output from either the summer 330 or the summer 335 according to the carry bit from summer 335. Generally, the output from the summer 330 will be fed back to the accumulator 345 once for each cycle, which is $1/(27\times10^6)$ sec in duration. Upon arrival of the carry, the mux 340 selects the output from summer 335 for input to the accumulator 345. The process is then repeated. Each toggled MSB provides the output clock signal at the reduced rate (e.g., 19,200 bps).

Accordingly, it can be seen that the present invention provides a method and apparatus for preventing data overflow in a buffer of a set-top decoder such as that used to receive digital television signals while also maintaining compliance with an interface timing standard such as the RS404-A standard. A fullness level of the buffer is monitored to determine whether the fullness falls within a first, nominal range, or into second or third higher ranges. A clocking signal is derived from a ratio of a fixed reference clock signal and a divisor for outputting asynchronous data from the buffer at a desired rate. The divisor is selected to provide the clocking signal at a first, second or third rate to minimize a difference between a target data output rate and the actual output rate to the extent possible while conforming to a data performance standard such as the RS404-A standard. The rate of the clocking signal is therefore increased as the buffer fullness level increases to maintain the buffer fullness within a nominal range.

Although the invention has been described in connection with various specific embodiments, those skilled in the art will appreciate that numerous adaptations and modifications may be made thereto without departing from the spirit and scope of the invention as set forth in the claims. For example, it will be understood that the specific reference clock frequency and tolerance discussed are illustrations only. Additionally, the most suitable divisor will depend on the particular application. Finally, the invention is compatible with virtually any data rate performance standard and is not limited to the RS404 standard.

What is claimed is:

1. A method for managing an asynchronous data buffer to provide an output data stream, comprising the steps of:
   (a) receiving asynchronous data;
   (b) writing at least a portion of said received asynchronous data into said buffer;
   (c) monitoring the fullness of said buffer to determine whether the fullness falls within one of at least a first range and a second range which is greater than said first range;
   (d) setting a target data output rate;
   (e) providing a fixed reference clock signal having an associated rate;
   (f) providing a clocking signal for outputting said asynchronous data from said buffer at a rate which corresponds to a ratio of said associated rate and a divisor;
   wherein:
      said divisor is a first divisor which is selected to provide said clocking signal at a first rate to minimize a difference between said target data output rate and said first rate when said monitoring step determines that said buffer fullness falls within said first range; and
      said divisor is a second divisor which is selected to provide said clocking signal at a second rate which is greater than said first rate when said monitoring step determines that said buffer fullness falls within said second range;
      said second divisor being selected so that a difference between the target data output rate and the output rate of said asynchronous data from said buffer is within first lower and upper bounds of a data performance standard.

2. The method of claim 1, wherein:
   said second divisor is selected so that said second rate is minimally greater than a sum of (i) said first lower bound of said data performance standard and (ii) a tolerance of said associated rate of said fixed reference clock signal.

3. The method of claim 2, wherein:
said first lower bound of said data performance standard is approximately 3,000 parts per million (ppm).

4. The method of claim 1, wherein:
said target data output rate is approximately $19,200/2^n$ bits per second, where n is a non-negative integer;
said associated rate of said fixed reference clock signal is approximately 27 MHz;
said first divisor is selected to be 1406 to provide said first rate at approximately $27\text{ MHz}/1406/2^n$; and
said second divisor is selected to be 1401 to provide said second rate at approximately $27\text{ MHz}/1401/2^n$.

5. The method of claim 1, wherein:
said first buffer fullness range extends below approximately 648/1024 of a maximum buffer fullness level; and
said second buffer fullness range extends above approximately 648/1024 of a maximum buffer fullness level.

6. The method of claim 1, comprising the further step of:
(g) monitoring the fullness of said buffer to determine whether the fullness falls within a third range which is greater than said second range; wherein:
said divisor is a third divisor which is selected to provide said clocking signal at a third rate which is greater than said second rate when said monitoring step determines that said buffer fullness falls within said third range;
said third divisor being selected so that a difference between the target data output rate and the output rate of said asynchronous data from said buffer is within second lower and upper bounds of the data performance standard, said second lower bound being more tolerant than said first lower bound.

7. The method of claim 6, wherein:
said third divisor is selected so that said third rate is minimally greater than a sum of (i) said second lower bound of said data performance standard and (ii) a tolerance of said associated rate of said fixed reference clock signal.

8. The method of claim 7, wherein:
said second lower bound of said data performance standard is approximately 8,000 parts per million (ppm).

9. The method of claim 6, wherein:
said target data output rate is approximately $19,200/2^n$ bits per second, where n is a non-negative integer;
said associated rate of said fixed reference clock signal is approximately 27 MHz;
said first divisor is selected to be 1406 to provide said first rate at approximately $27\text{ MHz}/1406/2^n$;
said second divisor is selected to be 1401 to provide said second rate at approximately $27\text{ MHz}/1401/2^n$; and
said third divisor is selected to be 1395 to provide said third rate at approximately $27\text{ MHz}/1395/2^n$.

10. The method of claim 6, wherein:
said first buffer fullness range extends below approximately 648/1024 of a maximum buffer fullness level;
said second buffer fullness range extends approximately from 648/1024 to 836/1024 of a maximum buffer fullness level; and
said third buffer fullness range extends above approximately 836/1024 of a maximum buffer fullness level.

11. The method of claim 1, wherein:
a least one of said first and second divisors is provided as a fractional divisor according to a direct digital synthesis circuit.

12. An apparatus for managing an asynchronous data buffer to provide an output data stream, comprising:
an input terminal for receiving asynchronous data;
means for writing at least a portion of said received asynchronous data into said buffer;
means for monitoring the fullness of said buffer to determine whether the fullness falls within one of at least a first range and a second range which is greater than said first range;
means for generating a fixed reference clock signal having an associated rate;
means for generating a clocking signal for outputting said asynchronous data from said buffer at a rate which corresponds to a ratio of said associated rate and a divisor; wherein:
said divisor is a first divisor which is selected to provide said clocking signal at a first rate to minimize a difference between a target data output rate and said first rate when said monitoring step determines that said buffer fullness falls within said first range; and
said divisor is a second divisor which is selected to provide said clocking signal at a second rate which is greater than said first rate when said monitoring step determines that said buffer fullness falls within said second range;
said second divisor being selected so that a difference between the target data output rate and the output rate of said asynchronous data from said buffer is within first lower and upper bounds of a data performance standard.

13. The apparatus of claim 12, wherein:
said second divisor is selected so that said second rate is minimally greater than a sum of (a) said first lower bound of said data performance standard and (b) a tolerance of said associated rate of said fixed reference clock signal.

14. The apparatus of claim 13, wherein:
said first lower bound of said data performance standard is approximately 3,000 parts per million (ppm).

15. The apparatus of claim 12, wherein:
said target data output rate is approximately $19,200/2^n$ bits per second, where n is a non-negative integer;
said associated rate of said fixed reference clock signal is approximately 27 MHz;
said first divisor is selected to be 1406 to provide said first rate at approximately $27\text{ MHz}/1406/2^n$; and
said second divisor is selected to be 1401 to provide said second rate at approximately $27\text{ MHz}/1401/2^n$.

16. The apparatus of claim 12, wherein:
said first buffer fullness range extends below approximately 648/1024 of a maximum buffer fullness level; and
said second buffer fullness range extends above approximately 648/1024 of a maximum buffer fullness level.

17. The apparatus of claim 12, further comprising:
means for monitoring the fullness of said buffer to determine whether the fullness falls within a third range which is greater than said second range; wherein:
said divisor is a third divisor which is selected to provide said clocking signal at a third rate which is greater than said second rate when said monitoring step determines that said buffer fullness falls within said third range;
said third divisor being selected so that a difference between the target data output rate and the output rate of said asynchronous data from said buffer is within second lower and upper bounds of the data performance standard, said second lower bound being more tolerant than said first lower bound.

18. The apparatus of claim 17, wherein:

said third divisor is selected so that said third rate is minimally greater than a sum of (a) said second lower bound of said data performance standard and (b) a tolerance of said associated rate of said fixed reference clock signal.

19. The apparatus of claim 18, wherein:

said second lower bound of said data performance standard is approximately 8,000 parts per million (ppm).

20. The apparatus of claim 17, wherein:

said target data output rate is approximately $19,200/2^n$ bits per second, where n is a non-negative integer;

said associated rate of said fixed reference clock signal is approximately 27 MHz;

said first divisor is selected to be 1406 to provide said first rate at approximately $27 \text{ MHz}/1406/2^n$;

said second divisor is selected to be 1401 to provide said second rate at approximately $27 \text{ MHz}/1401/2^n$; and said third divisor is selected to be 1395 to provide said third rate at approximately $27 \text{ MHz}/1395/2^n$.

21. The apparatus of claim 17, wherein:

said first buffer fullness range extends below approximately 648/1024 of a maximum buffer fullness level;

said second buffer fullness range extends approximately from 648/1024 to 836/1024 of a maximum buffer fullness level; and said third buffer fullness range extends above approximately 836/1024 of a maximum buffer fullness level.

22. The apparatus of claim 12, further comprising:

a direct digital synthesis circuit for providing at least one of said first and second divisors as a fractional divisor.

\* \* \* \* \*